July 23, 1968 H. E. DURR ET AL 3,393,853

APPARATUS FOR SECURING A PLURALITY OF CONDUCTORS TO COMPONENTS

Filed Sept. 17, 1965 7 Sheets-Sheet 1

INVENTORS
H.E. DURR
R.G. RAUCH
By A. J. Nugent
ATTORNEY

July 23, 1968 H. E. DURR ET AL 3,393,853

APPARATUS FOR SECURING A PLURALITY OF CONDUCTORS TO COMPONENTS

Filed Sept. 17, 1965 7 Sheets-Sheet 2

July 23, 1968 H. E. DURR ET AL 3,393,853

APPARATUS FOR SECURING A PLURALITY OF CONDUCTORS TO COMPONENTS

Filed Sept. 17, 1965 7 Sheets-Sheet 3

APPARATUS FOR SECURING A PLURALITY OF CONDUCTORS TO COMPONENTS

Filed Sept. 17, 1965 7 Sheets-Sheet 4

United States Patent Office 3,393,853

Patented July 23, 1968

3,393,853

APPARATUS FOR SECURING A PLURALITY OF CONDUCTORS TO COMPONENTS

Helmut E. Durr, Chatham Township, Morris County, N.J., and Richard G. Rauch, Morrisville, Pa., assignors to Western Electric Company, Incorporated, New York, N.Y., a corporation of New York Filed Sept. 17, 1965, Ser. No. 488,113

20 Claims. (Cl. 228—14)

This invention relates to the securing of conductors to terminals and more particularly to the soldering of a plurality of conductors to a plurality of terminals of electrical components such as connectors.

Electrical connectors having a plurality of terminals thereon have attained widespread use in the electrical industry in recent years. The connectors are characterized by a plurality of relatively small, closely spaced terminals, each terminal being adapted to be connected to a conductor. As part of the process of fabricating electrical equipment which include one or more of these connectors, it is necessary to secure the conductors to the terminals, preferably in the most rapid and efficient way possible.

Since soldering is a most common and efficient method of securing conductors to terminals, attempts were made at adapting existing automatic soldering techniques for use on the multi-terminal connectors, but these techniques were not suitable for the close tolerance precision work necessary. As a result, reliance had to be placed on hand soldering, which, even when executed by skilled operators, is inherently slow and somewhat costly.

It is, accordingly, an object of this invention to provide apparatus for automatically soldering a plurality of conductors to a plurality of corresponding terminals.

It is a further object of this invention to provide apparatus for simultaneously soldering a large number of connections utilizing a predetermined amount of solder from a single source.

It is another object of this invention to provide apparatus for rapidly and automatically presenting a succession of connectors to a work station whereat a plurality of conductors will be secured to the terminals thereon.

It is another object of this invention to provide a soldering head operable to separate a strip of solder into a plurality of segments of predetermined size, and guide the solder portions into a plurality of individual terminals to which a plurality of individual conductors are to be connected.

It is an additional object of this invention to provide a soldering head operable to simultaneously cause a flow of solder about a plurality of conductors and secure them to a corresponding plurality of terminals.

With these and other objects in mind, one embodiment of the invention includes component feeding means operable to receive a succession of components having a plurality of terminals thereon and deliver them one at a time to a work station, means operable to advance a plurality of conductors to the work station, means responsive to the feeding of the conductors for feeding a strip of solder to the work station, and a heating die mounted at the work station and operable to be moved into engagement with the strip of solder. The heating die includes a first element operable to separate the strip of solder into a plurality of segments and a second element operable to heat the solder segments and cause a flow of solder along the terminals and the conductors to thereby secure the latter to the terminals.

A complete understanding of the invention may be had from the following detailed description of a specific embodiment thereof when read in conjunction with the appended drawings wherein.

The invention will be described in connection with a preferred embodiment thereof designed for soldering a plurality of conductors 10—10 to a plurality of terminals 12—12 of an electrical component 14 such as, for example, a quick connect plug having terminals 12—12 on both sides thereof, sold under the trademark "Microribbon" by the Amphenol Connector Division of the Amphenol-Borg Electronics Corp., Chicago, Ill. and shown in FIG. 11.

Figures 1, 3:
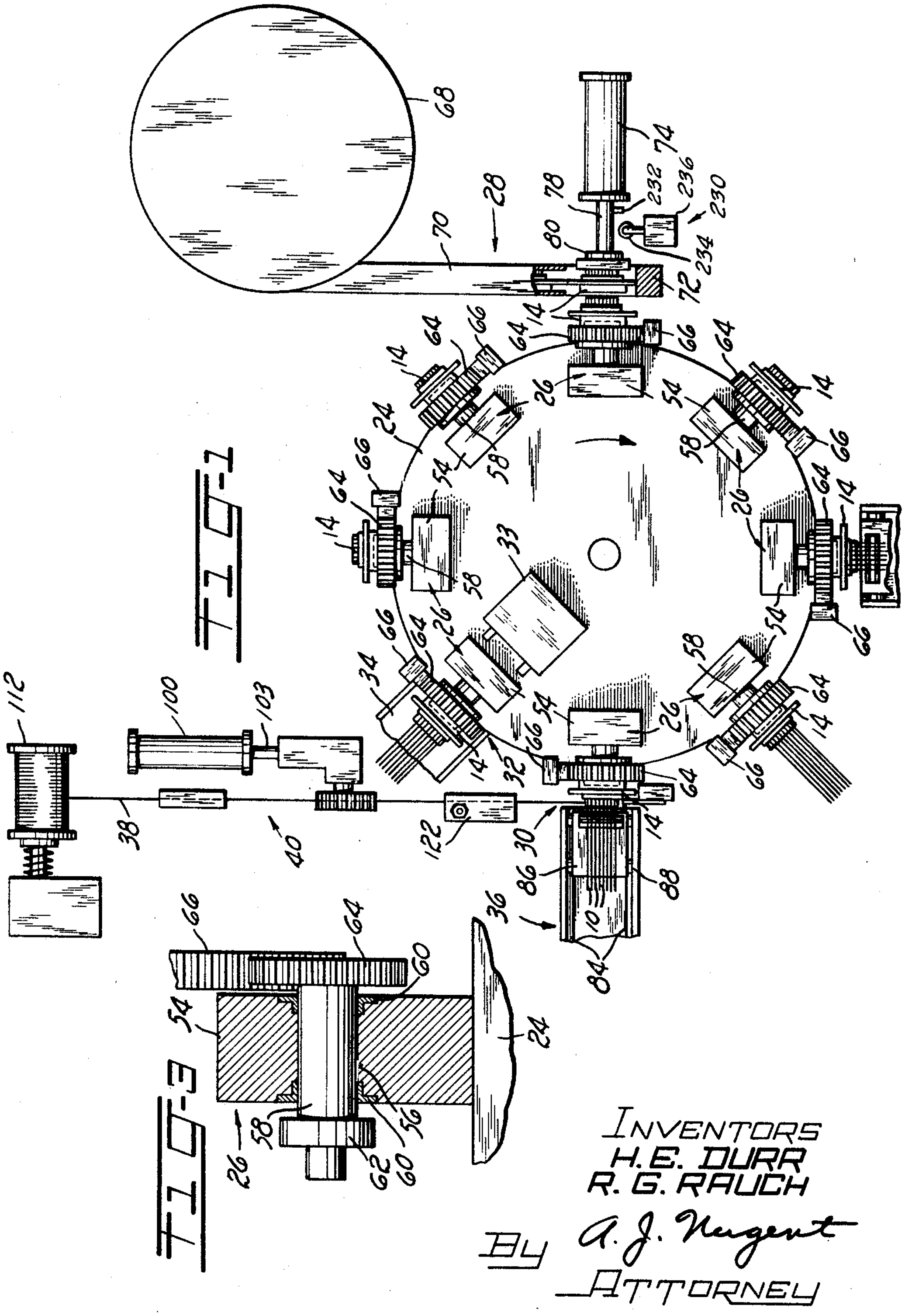
FIG. 1 is a plan view of an apparatus for soldering a plurality of conductors to a plurality of terminals showing the major elements thereof.
FIG. 3 is a side elevation view of the component nest means.
Figure 2:
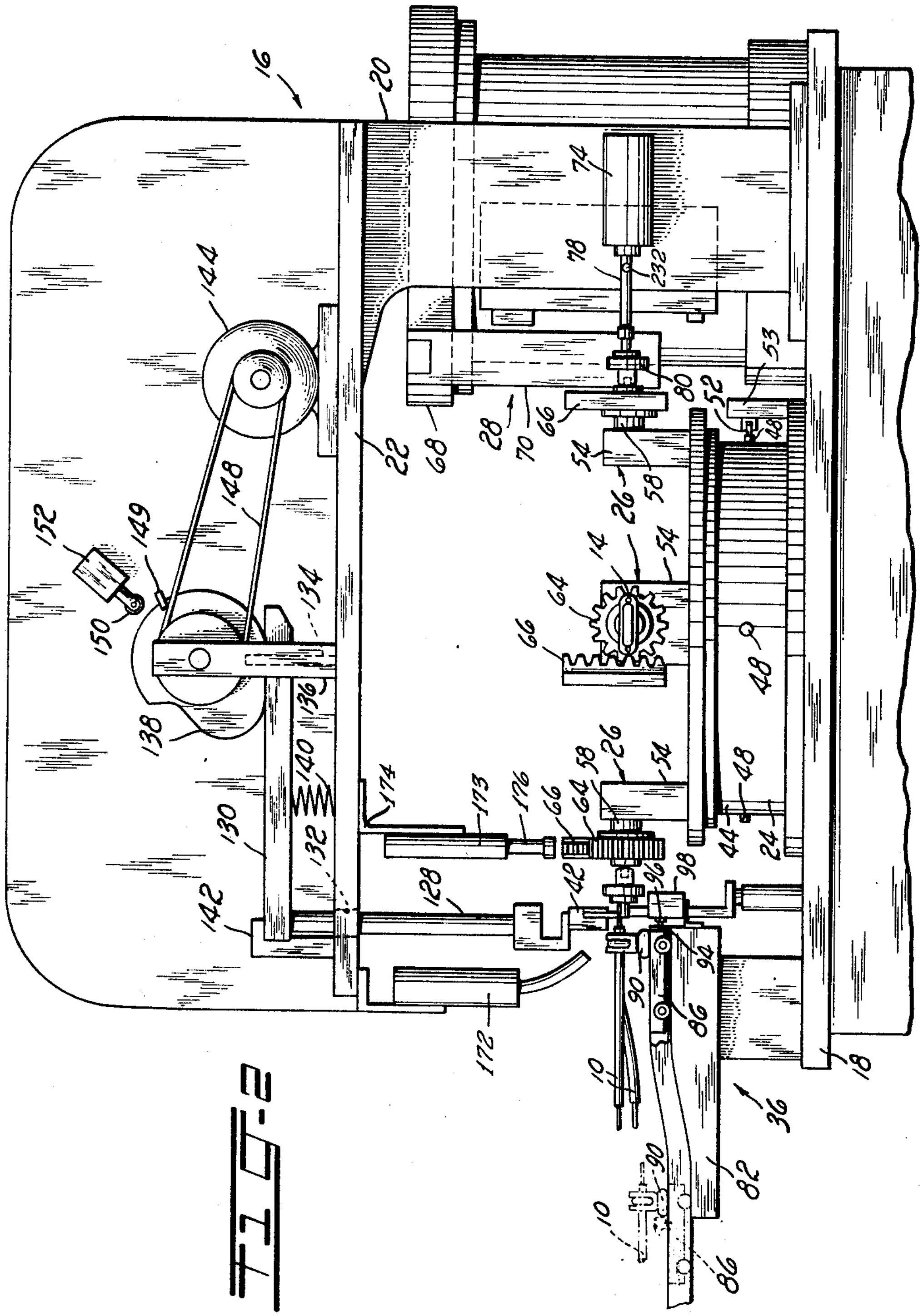
FIG. 2 is a front elevation view of the apparatus.

With reference to FIGS. 1 and 2 of the drawings, the preferred embodiment of the invention comprises a frame 16 which includes a base 18, an upright member 20, and a support member 22 which is mounted on upright member 20 such that it is suspended over base 18 and in spaced relationship therewith. An indexing table 24 is mounted on base 18 and includes a plurality of component nests 26 mounted on the top surface thereof. Nests 26 are adapted to receive connectors 14 fed thereto from a component feeding assembly 28 and advance them first to a work station 30 where the soldering operation takes place, and subsequently to a position 32 whereat the components are removed from the nest 26 by an ejection assembly 33 and ejected onto a chute 34 for conveyance to a storage area.

During the interval, a component 14 is supported in work station 30 by a nest 26, a plurality of conductors 10—10 are presented thereto by a subassembly 36, and a predetermined length of solder strip is fed across terminals 12—12 of the component by a solder feeding device 40. A soldering head 42 is mounted for reciprocal motion at the work station, and is adapted to be moved into engagement with the solder strip to melt the latter and thereby secure the conductors to the terminals of the component. It is conceivable, of course, that the soldering head can be reciprocated in an arcuate path.

Figure 14:
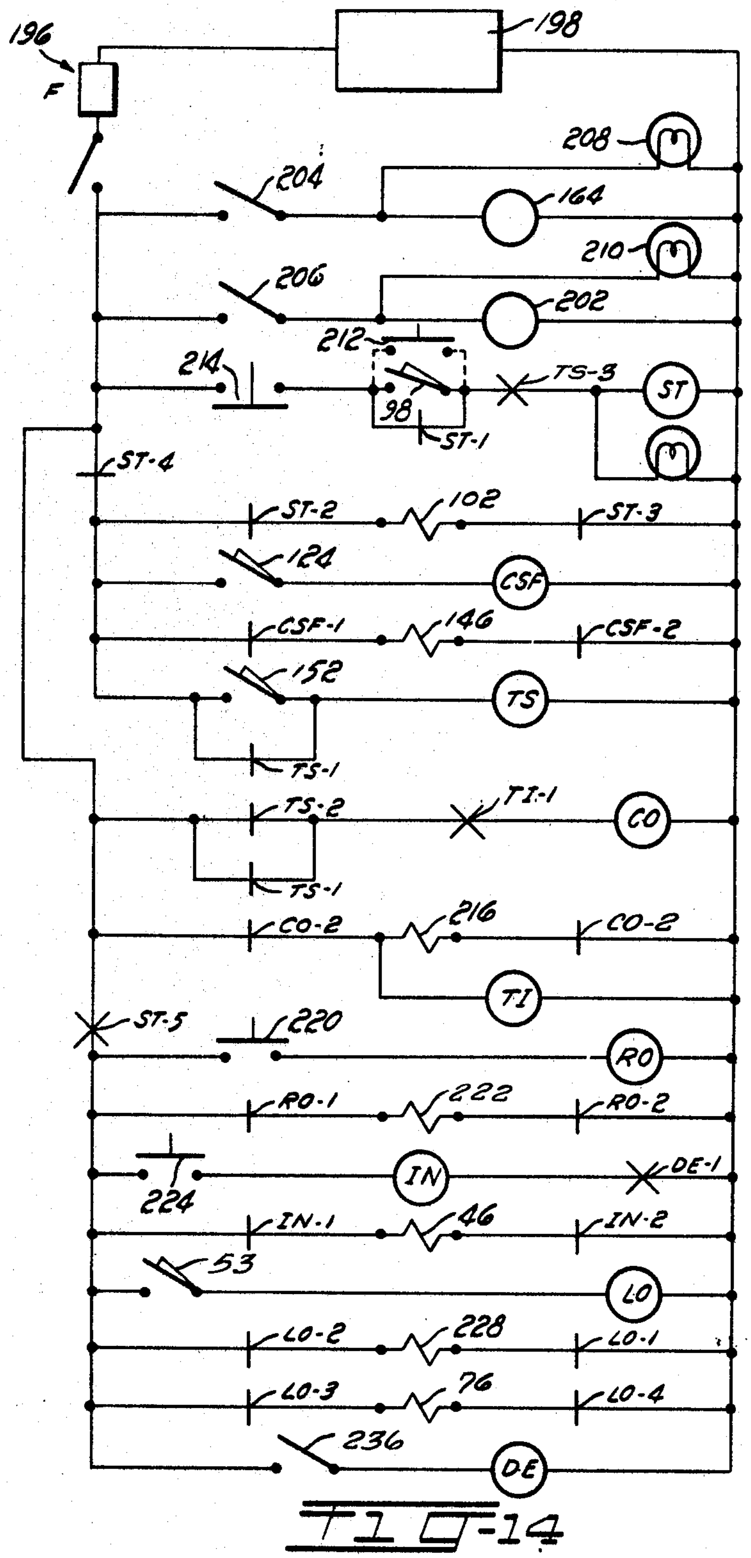
FIG. 14 is a schematic showing of an electric circuit for the apparatus.

The indexing table is rotated by a pawl and ratchet combination (not shown) which is mounted within the body portion 44 thereof and actuated by an air cylinder (not shown) operated by a solenoid 46 (FIG. 14). The angular displacement caused by each rotational movement of table 24 is determined by the size and displacement of the ratchet teeth which, in this instance, are selected to provide sufficient angular displacement during each indexing movement that each movement causes a new component nest 26 to be advanced into work station 30. A plurality of actuating members 48—48 are mounted on the body portion 44 of indexing table 24, one actuating member being located below each component receiving nest 26 so as to be in a position to trip an actuating button 52 of a limit switch 53 at the end of each indexing movement.

Referring to FIG. 3, each component nest 26 includes a vertically extending support 54 having a passage 56 bored therethrough. A shaft 58 is rotatably mounted in passage 56 on bearings 60—60. One end of shaft 58 includes an adaptor 62 which is shaped to receive and support a component 14. A pinion gear 64 is mounted on the other end of shaft 58, and is mated to a rack 66, which extends upwardly as shown in FIG. 3, and is adapted, upon the advancement thereof, to rotate the component 14 on adaptor 62 through an angle of 180°.

Component feeding assembly 28 includes a vibratory parts feeder 68 which is mounted on base 18 in spaced relationship with the indexing table 24 (FIG. 1) and includes a feed track 70. The end of feed track 70 includes a stop block 72 which is located so that a delivered component 14 will be stopped in feed track 70 when it is in spaced relationship with an adaptor 62 of a component nest 26. An air cylinder 74 operated by a solenoid 76 (FIG. 14) and including a piston rod 78 thereon is mounted on base 18 on the other side of feed track 70 from the indexing table 24. A flat shaped member 80 is connected to the end of piston rod 78 and is operable to push a connector 14 from feed track 70 and mount it on an adaptor 62.

Conductor feeding subassembly 36 includes a stand 82 (FIG. 2) having tracks 84 therein, the stand being mounted on base 18 with one end thereof adjacent work station 30. A carriage 86 having wheels 88—88 is mounted on tracks 84, and is adapted to receive a holder 90 on the top surface thereof. Holder 90 is loaded with a plurality of conductors 10—10 which have had the insulation removed from one end thereof and are arranged in a predetermined pattern. The conductors are prepared in such a pattern in an apparatus disclosed in assignee's copending application, Ser. No. 390,625, filed Aug. 19, 1964 now U.S. Patent 3,353,571 issued to H. E. Durr and F. Wahl on Nov. 21, 1967. Carriage 86 is movable along tracks 84 from a first position shown in phantom in FIG. 1 to a second position shown in solid lines in that figure. Holder 90 is mounted on carriage 86 such that when the carriage is advanced to its second position, the stripped ends of the conductors will be inserted into the terminals 12 of a component 14 being supported in work station 32 on a component nest 26. An actuating rod 94 is mounted on the leading end of carriage 86 and is operable to trip an actuating button 96 of a limit switch 98 when the carriage is moved to its second position.

Figure 4:
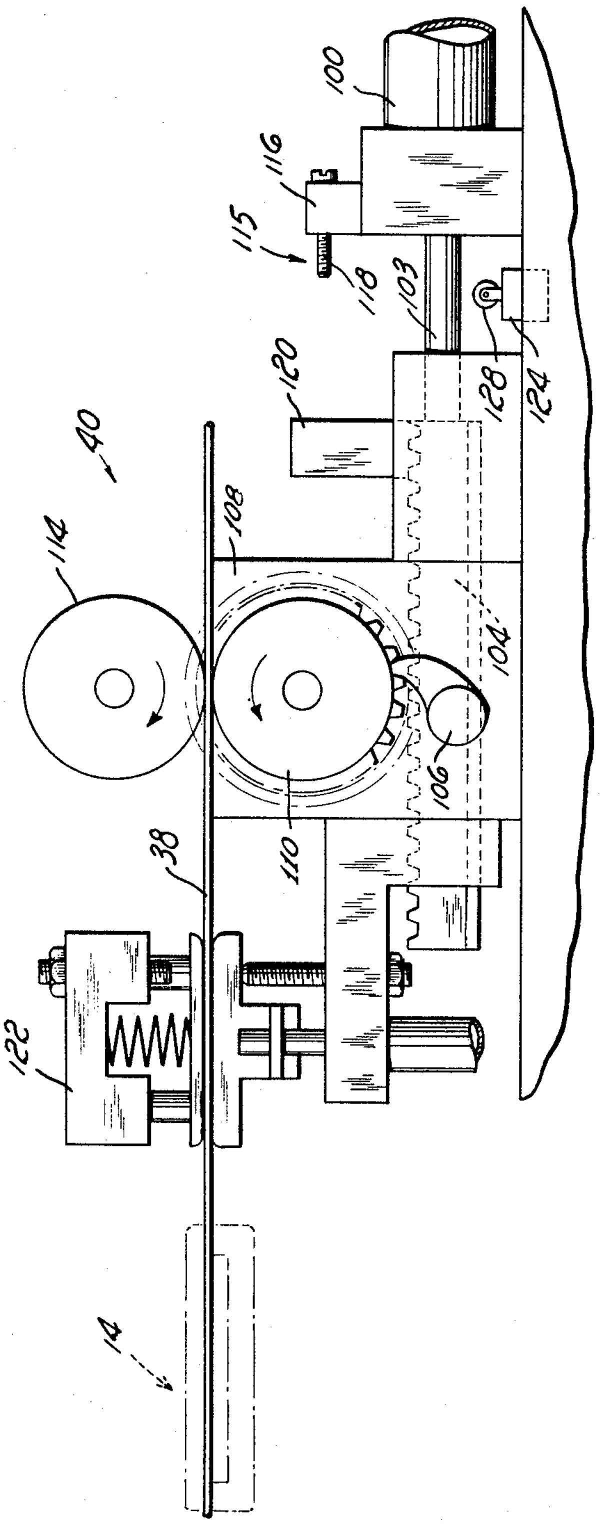
FIG. 4 is an elevation view of solder feeding means.
Figure 5:
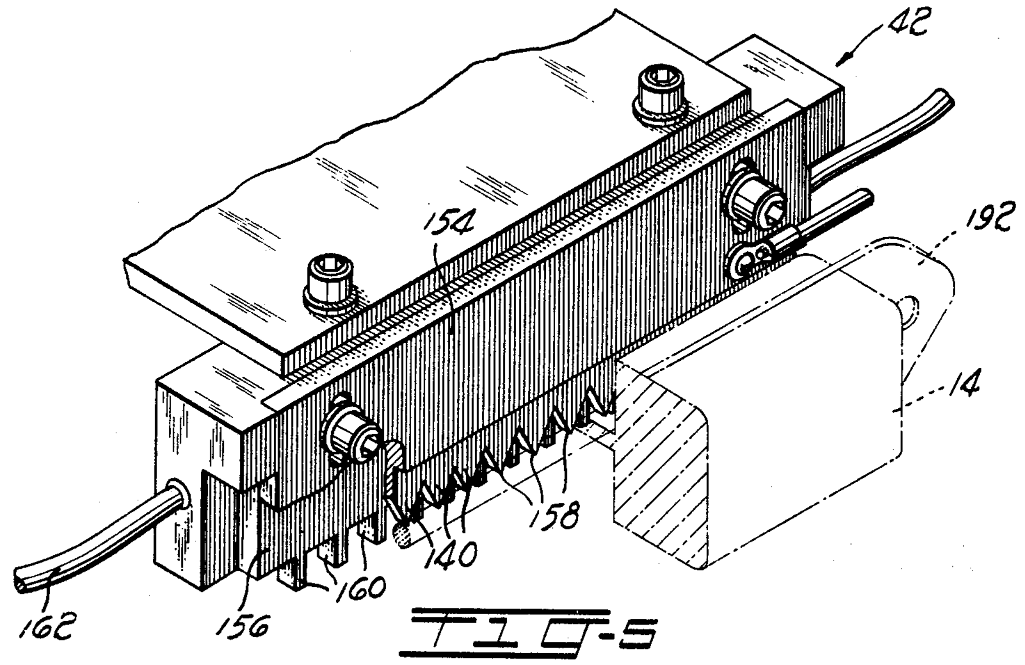
FIG. 5 is an isometric close-up view of the heating die as it engages the component and the solder strip.

Solder feeding device 40 is positioned on base 18 such that the solder strip is fed laterally across the terminals 12 of the component 14 in the work station 32. As shown in FIG. 4, solder feeding device 40 includes an air cylinder 100 which is operated by a solenoid 102 (FIG. 14) and includes a piston rod 103, to which a rack 104 is rigidly attached. The rack 104, which includes a pawl 106, is slidably mounted in a housing 108 which also encloses a pinion gear 110 rotatably mounted therein. Pawl 106 is shaped to permit retraction of rack 104 without affecting the displacement of the solder strip. Solder from a freely rotatable spool 112 is threaded through pinion gear 110, and an idler gear 114 mounted in spaced relationship therewith.

Upon activation of air cylinder 100, rack 104 will be driven to the right as seen in FIG. 4. The rectilinear motion of rack 104 is transmitted into rotary motion of pinion 110, which, in cooperation with idler gear 114, will advance solder strip 38 toward the work station. Since a precise length of solder strip, equal to the total length of the plurality of terminals, is required, an adjustable stop 115 is provided for rack 104. This stop includes a block 116 mounted on air cylinder 100, a screw 118 threadedly mounted in block 116, and a vertically extending member 120 mounted on rack 104 such that it will strike screw 118 when the rack is driven to the right by the air cylinder. The engagement of screw 118 with block 120 halts the motion of rack 104, and thus by adjustment of screw 118, the amount of solder advanced into work station 30 can be controlled.

A guide 122 is provided to aid in feeding the solder strip 38 in a straight path as it proceeds towards the work station. A limit switch 124 including an actuating button 128 is mounted on table 18 in the line of travel of rack 104 so that the limit switch will be activated at the end of the stroke of the rack.

Soldering head 42 is mounted to support member 22 by a linkage that permits the reciprocal motion thereof. This linkage includes a rod 128 connected at one end thereof to the soldering head and at the other end thereof to a bar 130. Rod 128 is vertically movable through an aperture 132 in support member 22, and bar 130 is vertically movable in grooves 134 in a pair of opposed vertically extending housing members 136—136. A cam 138 is rotatably mounted in housing members 136—136, bar 130 being urged against the bottom of the cam by a spring 140. A stop 142 is provided to assist in limiting the reciprocal movement of bar 130.

An electric motor 144 is mounted on support member 22 in spaced relationship with cam 138. A pulley 148 connects motor 144 with cam 138 and will rotate the latter upon activation of a solenoid 146 operated clutch connected theretbetween. Rotation of cam 138 depresses bar 130, causing the soldering head to be lowered into the work station to engage a component, the conductors and solder strip therein. Further rotation of cam 138 permits spring 140 to raise the soldering head out of the work station. An actuating member 149 is mounted on cam 138 and is operable to engage an actuating button 150 of a limit switch 152 at the end of each revolution of the cam 138.

With reference to FIGS. 5–11, the soldering head 42 comprises a first plate 154 and a second plate 156 mounted contiguous thereto. First plate 154 has a plurality of triangular elements 158—158 at one end thereof and second plate 156 includes a plurality of blunt, substantially rectangular elements 160—160. Appropriate wiring 162 is connected to a generator 164 (FIG. 14) to heat the soldering head.

Figure 6:
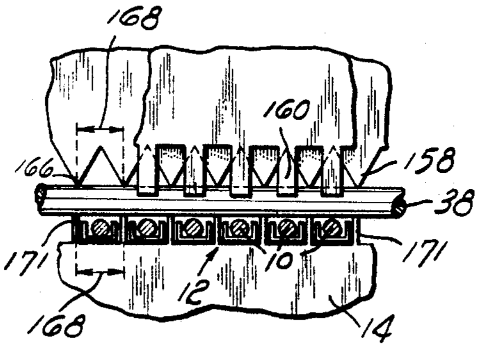
FIG. 6 is a partial front view of the heating die as it engages the component and the solder strip.
Figure 7:
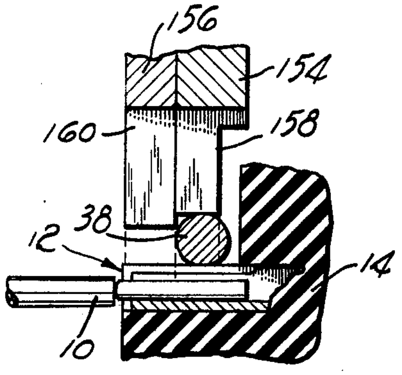
FIG. 7 is a partial side view of the heating die as it engages the solder strip and the component.

Triangular elements 158 are of uniform dimension and the apices 166 thereof are spaced apart a predetermined distance, which is determined by the width of the terminals being wired, as shown by arrows 168—168. The second plate 156 is mounted to the first plate 154 in such a manner that blunt elements 160—160 are centered in the spaces between the apices 166 of triangular elements 158. As seen in FIGS. 6 and 7, blunt elements 160—160 are longer than triangular elements 158—158, and are of such width that they will extend into the terminals of a component being wired to engage the stripped ends of the conductors therein.

By designing triangular elements 158—158 and blunt elements 160—160 in this manner, solder strip 38, which was advanced into work station 30 so that it lies across terminals 12 of a component 14 (FIG. 6), is divided into a plurality of segments 170 (FIG. 9) by apices 166 of triangular elements 158—158. The apices 166 come to rest on or slightly above the shoulders 171 of the component 14 with the leading edge of blunt elements 160 extending into the terminals 12 to engage the stripped portions of conductors 10 therein. Before the soldering head engages the solder strip, elements 158 and 160 are at the same temperature. However, in cutting and starting to melt the solder, element 158 gives up some heat, leaving element 160 slightly hotter. Since solder flows toward the hottest location, the solder will flow towards element 160, i.e., the outside of the terminal. At the same time, element 160 engages the outside portion of the stripped conductor, heating it and giving up heat thereby. This starts a flow of solder back towards the back of the terminal.

Figures 10, 11:
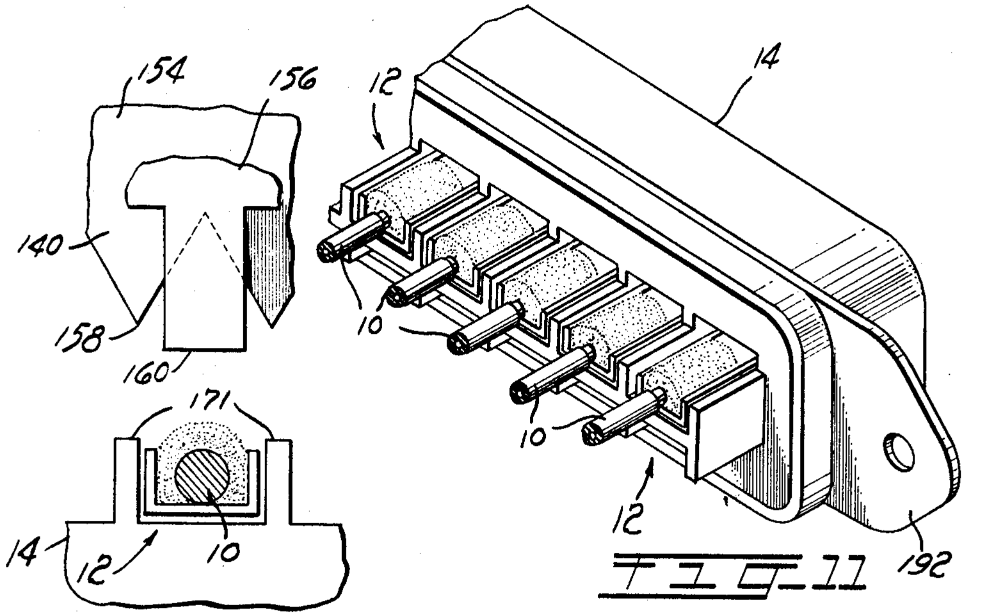
FIG. 11 is a partial view of a component after the soldering operation has taken place.

Looking at the vertical dimension, the heating of the stripped conductor causes a flow of solder towards the bottom of the terminal and underneath the conductor, the final distribution of solder being that shown in FIGS. 10 and 11.

Referring once again to FIG. 2, an air cooling means 172 is mounted adjacent work station 30 to direct a blast of air on the molten solder after the soldering head 42 is raised out of the work station, and an air cylinder 173 is mounted to the underside of support member 22 by a bracket 174 and is positioned such that its piston rod 176 is in spaced relationship with the rack 66 of a component nest 26, located in work station 32.

Figure 12:
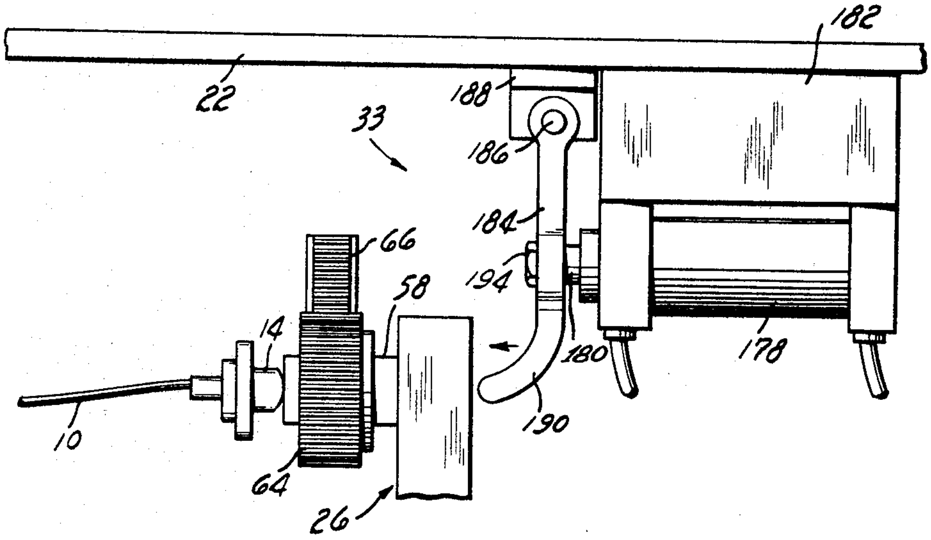
FIG. 12 is a side elevation view of a component ejecting subassembly.
Figure 13:
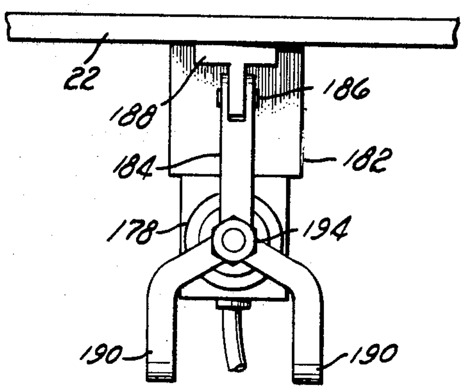
FIG. 13 is a front elevation view of the component ejecting subassembly.

Ejection assembly 33, shown schematically in FIG. 1 and in detail in FIGS. 12 and 13 includes an air cylinder 178 having a piston rod 180, the cylinder 178 being suspended from support member 22 by a bracket 182. A bifurcated member 184 is connected, by a hinged mounting 186, to a second bracket 188 suspended from support member 22 in spaced relationship with bracket 182. Bifurcated member 184 includes two ejecting arms 190—190 spaced apart a distance such that they may engage the outside flanges 192 of the component 14 Bifurcated member 184 is connected to piston rod 180 at the juncture 194 of ejecting arms 190—190 so that, upon activation of air cylinder 178, piston rod 180 will be advanced to the left as shown by the arrow in FIG. 12, pivoting bifurcated member 184 about hinged mounting 186, the tips of arms 190—190 being advanced to engage flanges 192 of component 14 and eject it onto chute 34.

The various parts of the apparatus are coordinated into a semiautomatic system by an electrical circuit 196 shown in FIG. 14. The circuit is powered by a unit 198 which, for convenience, may be a 110 volt alternating current source. Electric generator and motor 164 and 202, for the heater and the vibratory parts feeder, respectively, are independently wired and are operated by hand switches 204 and 206, respectively. When devices 164 and 202 are turned on, indicator lights 208 and 210, respectively, light up.

The automatic cycle starts when a carriage 86, having a holder 90 full of conductors 10—10, is advanced along tracks 84 to its second position, shown in solid lines in FIG. 1. At that position, the stripped conductor ends are inserted into the terminals of a connector 14 which had been previously indexed into the work station, and actuating rod 94, mounted on the leading edge of carriage 86 trips actuating button 96 of limit switch 98, thereby energizing a relay ST connected in series therewith. The energization of relay ST closes its normally open contacts ST–1, ST–2, and ST–3. A hand switch 212 is provided to continue the cycle if actuating button 96 is not engaged by carriage 86. An emergency stop switch 214 is connected in series with relay ST to halt the cycle if trouble arises.

Closure of contact ST–1 maintains the ST relay in an energized state through a normally closed contact TS–3 so that carriage 86 may be withdrawn to its first position to receive the next holder 90 full of conductors. Closure of contacts ST–2 and ST–3 activates solenoid 102 which operates air cylinder 100, causing piston rod 103 to advance rack 104 and thereby feed a predetermined amount of solder strip into the work station, positioned across the terminals of the component 14 therein. At the end of its travel, rack 104 trips actuating button 128 of limit switch 124, which causes the energization of a CSF relay connected in series therewith.

Figure 8:
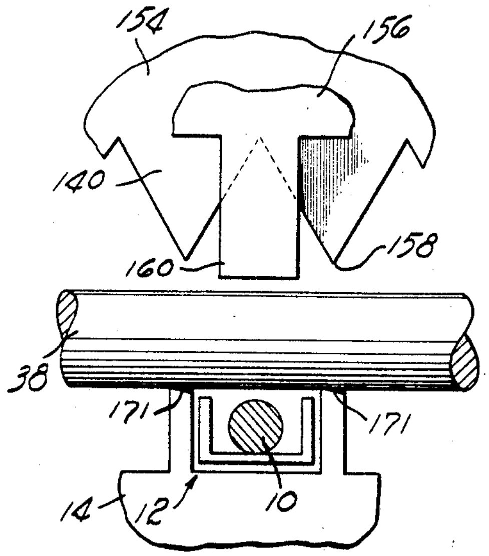
FIGS. 8–10 is a sequential showing of the operation of the heating die in soldering a conductor to a terminal.
Figure 9:
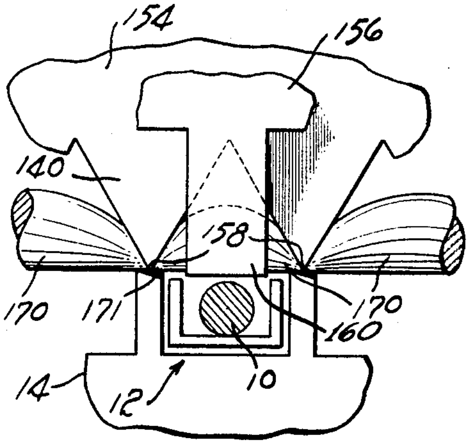

The energization of the CSF relay activates solenoid 146 by closure of contacts CSF–1 and CSF–2, which causes the engagement of the clutch between motor 144 and drive band 148, resulting in the lowering of soldering head 42 into work station 30 to segment and melt the solder strip (FIGS. 8–10). Upon the completion of one revolution of camming member 138, actuating member 149 engages button 150 of limit switch 152, energizing relay TS, which causes, by opening contact TS–3, the de-energization of the ST relay and the energization of a CO relay. De-energization of the ST relay causes the above described circuit to be de-energized and returned to start. Energization of the CO relay activates the solenoid 216 of solenoid operated air cooling means 172 (FIG. 2) which directs a blast of air at the component just soldered to solidify the molten solder. The duration of the air blast is controlled by a timing relay T1 having a normally closed contact T1–1 in series with the CO relay to de-energize it a short time after its energization.

At this time a button 220 mounted on base 18 is depressed, activating relay RO which, through contacts RO–1 and RO–2, controls a solenoid 222 which operates air cylinder 173, causing piston 176 thereof to move into work station 30 and strike rack 66, thereby rotating the component 14 in the component nest 180°, exposing the terminals 12—12 on the other side thereof.

Another carriage 86 including a holder 90 of conductors is advanced into the work station, initiating the soldering cycle again. After the rotation of camming member 138 has caused the soldering of the conductors to the terminals of the other side of the component, and the solder has been air cooled, a button 224 on base 18 is depressed, energizing relay IN, which activates solenoid 46 which controls the air cylinder (not shown) which rotates the indexing table 24 by activating the pawl and ratchet mounted therein. At the end of the indexing movement, a member 48 engages button 52 of limit switch 53, energizing a relay LO connected in series therewith. The energization of relay LO closes normally open contacts LO–1, LO–2, and LO–4 which activate solenoids 228 and 76. Activation of solenoid 228 activates air cylinder 178 of ejection subassembly 33, causing the component on the component holding member 26 in the position designated 32 to be removed therefrom and delivered to chute 34.

At the same time a finished component is being removed from the component nest 26 in position 32, the component nest 26 in the position designated 230 is ready to receive a new component 14 from feed track 70. The component is transferred from feed track 70 to adaptor 62 by flat shaped member 80 which is advanced upon the activation of solenoid 76. Advancement of flat shaped member 80 causes the de-activation of the indexing and loading circuit by advancing actuating member 232 on piston rod 78 (FIG. 1) so that it trips actuating button 234 of a limit switch 236 which energizes a DE relay connected in series therewith. Energization of the DE relay opens normally closed switch DE–1, de-energizing the IN relay which de-activates solenoid 216, which opens switch 53, causing the de-activation of solenoids 228 and 76.

In addition, the indexing movement of table 24 had positioned another component nest 26 in the work station 30, and the cycle may be started again by advancing a carriage 86 into work station 30.

Thus, the instant apparatus provides means for soldering a plurality of conductors to a corresponding plurality of terminals of a succession of electrical connectors in a rapid and efficient manner. More specifically, due to the design of soldering head 42, by proper selection of solder strip size along with tailoring the dimensions of the triangular and blunt elements to the size of the terminals a desired amount of solder may be applied uniformly to the several terminals.

It is to be understood that the above-described arrangements are simple illustrative examples of the application of the principles of the invention. Numerous other arrangements may be readily devised by those skilled in the art, which will embody the principles of the invention and fall within the spirit and scope thereof.

What is claimed is:

1. Apparatus for securing a plurality of conductors to a plurality of terminals of an electrical component comprising:

a work station, means for advancing components one at a time to the work station, means for feeding a plurality of individual wires to the individual terminals of a component advanced to the work station, means for feeding a single strip of solder to a position adjacent the component terminals, a heatable die reciprocably mounted at the work station and including means for cutting the solder strip into segments, and heating the segments to cause the solder to flow about the individual wires, and means for causing reciprocating movement of the heatable die in timed relation to the solder feeding means.

2. Apparatus for securing a plurality of conductors to a plurality of terminals of an electrical component comprising:

a work station, means for advancing a succession of components, each having a plurality of individual terminals, one at a time to the work station, means for feeding a plurality of individual wires to the individual terminals of the component, means for feeding a single strip of solder to a position adjacent the component terminals, a heatable die mounted in the work station and operable to be moved into engagement with the solder strip, the heating die including:

a first element operable to separate the solder strip into a plurality of segments, and a second element operable to cause the solder to flow about the conductors to bond them to the terminals, and means for initiating operation of the heatable die after the solder strip has been fed into its position adjacent the terminals.

3. Apparatus for securing a plurality of conductors to a plurality of terminals of an electrical component, comprising:

a work station, means for advancing components one at a time to the work station, means for feeding a plurality of individual wires to the individual terminals of the component, means for feeding a single strip of solder to a position adjacent the component terminals, a heatable die mounted in the work station and operable to be moved into engagement with the component, conductors and solder strip in the work station, the heating die including:

a first plate having a plurality of cutting elements at one end thereof, a second plate connected to the first plate and having a plurality of blunt elements at one end thereof, and the cutting elements of the first plate being operable, when moved into engagement with the solder strip, to separate the solder strip into segments corresponding to the component terminals, the blunt elements of the second plate being operable to cause the solder to flow along the terminals and about the conductors to secure them to the terminals, and means for initiating operation of the heatable die after the solder strip has been fed into its position adjacent the terminals.

4. Apparatus for securing a plurality of conductors to a plurality of terminals of an electrical component, comprising:

component feeding means operable to receive a succession of components each having a plurality of terminals thereon and deliver the components one at a time to a work station, means mounted adjacent the work station operable to present a plurality of conductors thereto, means responsive to the presentment of the conductors to the work station for feeding a strip of solder to the work station, and a heatable die operable in response to the feeding of the solder strip to cut the solder strip into a plurality of segments, guide the segments into the component terminals, and cause a flow of solder about the conductors to secure them to the terminals.

5. Apparatus for securing a plurality of conductors to a plurality of terminals of an electrical component comprising:

a work station, component feeding means operable to receive a succession of components each having a plurality of terminals thereon and deliver them one at a time to a work station, means for presenting a plurality of conductors to the work station, means responsive to the conductors presenting means for feeding a strip of solder to the work station, and a heatable die mounted in the work station and operable to be moved into engagement with a component, the conductors and the solder strip, the heating die including:

a first element operable to separate the solder strip into a plurality of segments, and a second element operable to cause the solder in each of the segments to flow about the conductors to bond them to the terminals.

6. Apparatus for securing a plurality of conductors to a plurality of terminals of an electrical component, which comprises:

a work station, an indexing table operable to receive a plurality of electrical components each having a plurality of terminals thereon and deliver them one at a time to the work station, means mounted adjacent the indexing table for presenting a plurality of conductors to the work station, means responsive to presentment of the conductors to the work station for feeding a strip of solder thereto, and a heatable die mounted in the work station and operable in response to operation of the solder feeding means to be moved into engagement with the component, conductors and solder strip, the heating die including:

a first element operable to separate the solder strip into a plurality of segments, and a second element operable to cause the solder in each of the segments to flow along the terminals and about the conductors to bond them to the terminals.

7. Apparatus for securing a plurality of conductors to a component having a plurality of terminals comprising:

means for placing a single strip of solder across the plurality of terminals, and a heatable die operable to be moved into engagement with the solder strip, component terminals, and conductors in response to operation of the solder placing means, and including:

a first plate, and a second plate connected to said first plate, the first plate being operable, when the heating die is moved into engagement with the solder strip, component terminals, and conductors, to separate the solder strip into a plurality of segments corresponding to the plurality of terminals, the second plate being operable to cause the solder to flow along the terminals and about the conductors to secure them to component terminals.

8. Apparatus for securing a plurality of conductors to a plurality of terminals of an electrical connector, which comprises:

a work station, means for advancing electrical connectors having a plurality of terminals thereon one at a time into the work station, means mounted adjacent the work station operable to present a plurality of conductors thereto, means responsive to said conductor presenting means for advancing a strip of solder to the work station, and a heatable die mounted in the work station and operable to be moved into engagement with the connector, conductors and solder strip in the work station, the heating die including:

a first plate having a plurality of cutting elements at one end thereof, a second plate connected to the first plate and having a plurality of blunt elements at one end thereof, the blunt elements being longer than the cutting elements of the first plate, and the cutting elements of the first plate being operable, when moved into engagement with the solder strip, to separate the solder strip into segments corresponding to the component terminals, the blunt elements of the second plate being operable to cause the solder in each of the segments to flow about the conductors to secure them to the terminals.

9. Apparatus for securing a plurality of conductors to a plurality of terminals of an electrical component according to claim 8, wherein the apparatus further comprises:

means for initiating operation of the heatable die after the solder strip has been advanced to the work station.

10. Apparatus for securing a plurality of conductors to a plurality of terminals of an electrical component, which comprises:

a work station, an indexing table having a plurality of component nests thereon, operable to receive a succession of components fed thereto and deliver them one at a time to the work station, means mounted adjacent the indexing table for presenting a predetermined number of conductors to the work station, said predetermined number corresponding to the number of terminals on the components, means responsive to presentment of the conductors to the work station for feeding a strip of solder to a position adjacent the component terminals, and a heatable die operable to be moved into engagement with the solder strip, component terminals, and conductors in response to operation of the solder feeding means, and including:

a first plate, and a second plate connected to said first plate, the first plate being operable, when the heating die is moved into engagement with the solder strip, component terminals, and conductors, to separate the solder strip into a plurality of segments corresponding to the plurality of terminals, while the second plate is operable to cause the solder to flow along the terminals and about the conductors to secure them to component terminals.

11. Apparatus for securing a plurality of conductors to a plurality of terminals of an electrical component according to claim 10 wherein:

said component nests including a rack and pinion for the rotation of a component held therein to expose terminals on a plurality of surfaces thereof to the conductors, solder strip and heating die.

12. Apparatus for securing a plurality of conductors to a plurality of terminals of an electrical component, which comprises:

a work station, an indexing table having a plurality of component nests thereon, operable to receive a succession of components each having a plurality of terminals and deliver them one at a time to the work station, means mounted adjacent the indexing table for feeding a plurality of individual conductors to the work station, means responsive to the feeding of the conductors to the work station for feeding a strip of solder of predetermined length to the work station, said strip of solder being fed so that it is positioned across the plurality of terminals on the conductor, a heatable die mounted in the work station, and operable to be moved from a first position where it is spaced from the component, to a second position where it engages the component, conductors and solder strip, said heating die including:

a first plate, and a second plate connected to said first plate, the first plate being operable, when the heating die is moved into engagement with the solder strip, component terminals, and conductors, to separate the solder strip into a plurality of segments corresponding to the plurality of terminals, and the second plate is operable to cause the solder in the segments to flow about the conductors to secure them to the component terminals, means mounted in juxtaposition with said heating die for delivering a stream of air to the component to cool the solder, and means mounted in the work station in spaced relationship with the indexing table for rotating the component and exposing terminals on the other side thereof for receiving conductors to be soldered.

13. Apparatus for securing a plurality of conductors to a plurality of terminals of an electrical component, which comprises:

a work station, an indexing table having a plurality of component receiving elements thereon, operable to receive a succession of components each having a plurality of terminals and deliver the components one at a time to a work station, means mounted adjacent the work station operable to present a plurality of conductors thereto, means responsive to said conductor presenting means for advancing a strip of solder into the work station, and a heatable die mounted in the work station, and operable to be moved from a first position where it is spaced from the component to a second position where it engages the component, conductors and solder strip, and back to said first position, said heating die including:

a first plate having a plurality of triangular cutting teeth at one end thereof, a second plate mounted contiguous to the first plate, and having a plurality of spaced rectangular forming members at one end thereof, the blunt elements being longer than the triangular cutting teeth, the first and second plates being mounted to each other in such a manner that the apices of the triangular teeth are centered with respect to the spaces between the rectangular elements so that when the heating die is moved into engagement with the solder strip, component and conductors, the cutting teeth separate individual segments of solder from the solder strip corresponding to the plurality of terminals of the component, while the forming elements extend into the terminals to heat the conductor ends and cause the solder in the segments to flow along the terminals and about the conductors to secure them to the terminals.

14. Apparatus for securing a plurality of conductors to a plurality of terminals of an electrical component according to claim 13 wherein:

said component receiving elements including a rack and pinion for the rotation of a component held therein to expose terminals on a plurality of surfaces thereof to the conductors, solder strip and heating die.

15. Apparatus for securing a plurality of conductors to a plurality of terminals of an electrical component according to claim 13 wherein:

said component receiving elements including a rack and pinion for the rotation of a component held therein to expose terminals on a plurality of surfaces thereof to the conductors, solder strip and heating die, and means are mounted in juxtaposition with said heating die and operable in response to the return of the heating die to its first position to direct a stream of air to the component terminals to cool the molten solder therein.

16. Apparatus for securing a plurality of conductors to a plurality of terminals of an electrical component, which comprises:

a work station, an indexing table having a plurality of component receiving elements thereon, operable to receive a succession of components fed thereto at a first position, advance them one at a time to the work station, and subsequently, deliver them to a second position, means mounted adjacent the indexing table for presenting a predetermined number of conductors to the work station, said predetermined number corresponding to the number of terminals on the components, means responsive to presentment of the conductors to the work station for feeding a strip of solder thereto, and a heatable die operable, in response to the feeding of the solder strip, to cut the solder strip into a plurality of segments corresponding to the plurality of terminals, and cause solder in the segments to flow about the conductors to secure them to the terminals.

17. Apparatus for securing a plurality of conductors to a plurality of terminals of an electrical component, which comprises:

a work station, an indexing table having a plurality of component receiving elements thereon, operable to receive a succession of components fed thereto at a first position, advance them one at a time into the work station, and subsequently, deliver them to a second position, feeding means having a chute for delivering components to a position in juxtaposition to the indexing table and in spaced relationship with a component receiving element thereon, a solenoid operated inserting member mounted in spaced relationship with the parts feeder chute and a component receiving element, wherein upon activation of the solenoid, the inserting member is operable to push a component from the chute onto the component receiving element, means mounted adjacent the work station operable to present a plurality of conductors thereto, means responsive to the presentment of the conductors to the work station for feeding a strip of solder to the work station, and a heatable die operable to, in response to the feeding of the solder strip, cut the solder strip into a plurality of segments corresponding to the plurality of terminals, and cause the solder in the segments to flow along the terminals and about the conductors to secure them to the terminals.

18. Apparatus for securing a plurality of conductors to a plurality of terminals of an electrical component according to claim 17 wherein:

a plurality of actuating members are mounted on the indexing table, one being mounted in spaced relationship with each component receiving element, a normally open switch is mounted adjacent the indexing table and operable to be closed by one of said actuating members at the completion of the indexing movement of the indexing table, the closure of the switch being operable to activate the solenoid of the inserting member.

19. Apparatus for securing a plurality of conductors to a plurality of terminals of an electrical component, which comprises:

a work station, an indexing table having a plurality of component supporting elements thereon, operable to receive a succession of components fed thereto at a first position, advance them one at a time into the work station, and subsequently, deliver them to a second position, means mounted adjacent the work station operable to present a plurality of conductors thereto, means responsive to the presentment of the conductors to the work station for feeding a strip of solder to the work station, a heatable die operable to, in response to the feeding of the solder strip, cut the solder strip into a plurality of segments, guide the segments into the component terminals, and cause the solder in the segments to flow along the terminals and about the conductors to secure them to the terminals, and solenoid operated component ejection means mounted in spaced relationship with the indexing table at said second positon and operable, upon activation of the solenoid, to remove a wired component from the component receiving element at said second position.

20. Apparatus for securing a plurality of conductors to a plurality of terminals of an electrical component according to claim 19 wherein:

a plurality of actuating members are mounted on the indexing table, one being mounted in spaced relationship with each component receiving element, and a normally open switch is mounted adjacent the indexing table and operable to be closed by one of said actuating members at the completion of the indexing movement of the indexing table, the closure of the switch being operable to activate the ejection means solenoid, causing a component to be removed from the component receiving element in said second position.

References Cited

UNITED STATES PATENTS 1,296,656 3/1919 Hamm ------------- 228—14

RICHARD H. EANES, Jr., *Primary Examiner.*